Jan. 20, 1942.　　　A. A. EWALD　　　2,270,283
ONE-WAY STOP MECHANISM
Filed June 19, 1941　　　3 Sheets-Sheet 1
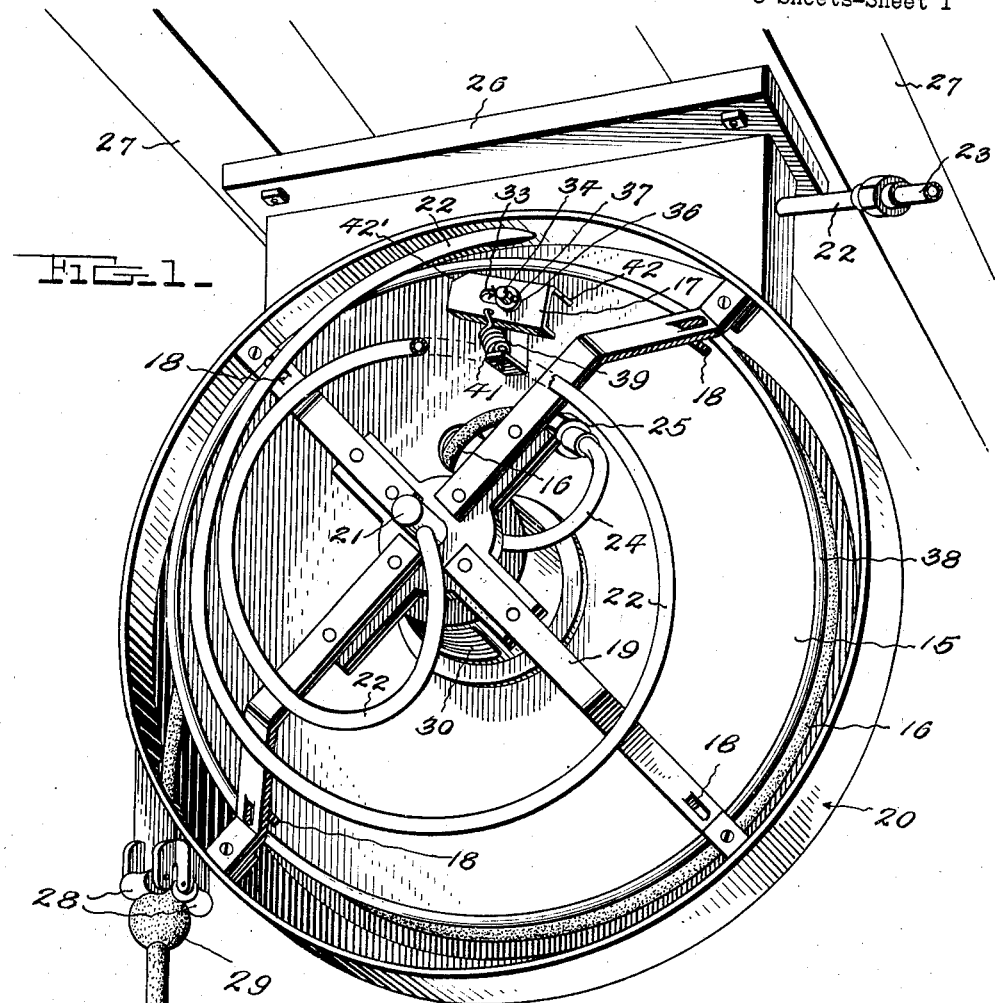
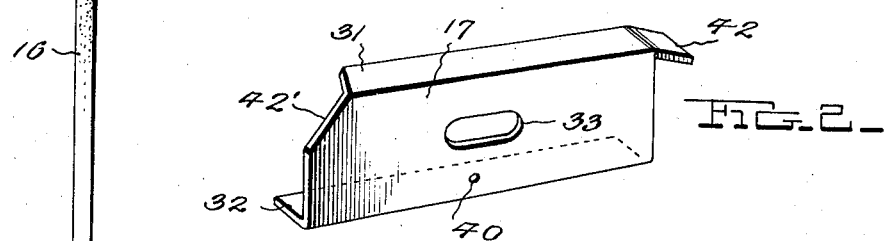
Inventor
A. A. Ewald
By H. R. Willson & Co.
Attorneys Jan. 20, 1942. A. A. EWALD 2,270,283
ONE-WAY STOP MECHANISM
Filed June 19, 1941 3 Sheets-Sheet 2

Inventor
A. A. Ewald
By H. B. Wilson & Co.
Attorneys

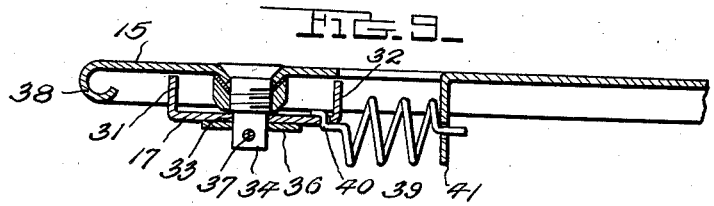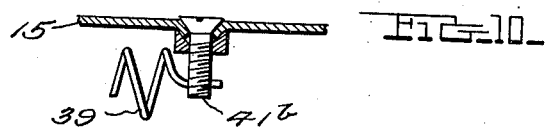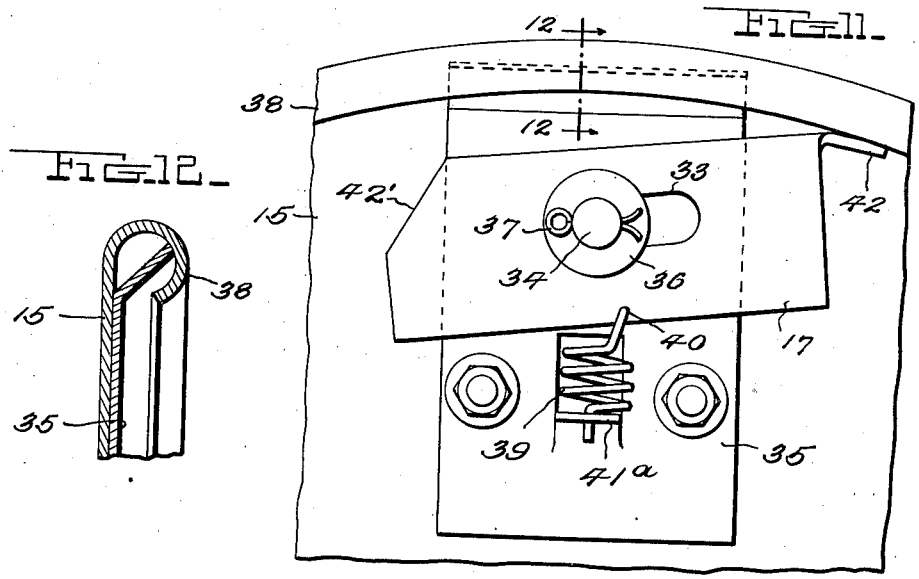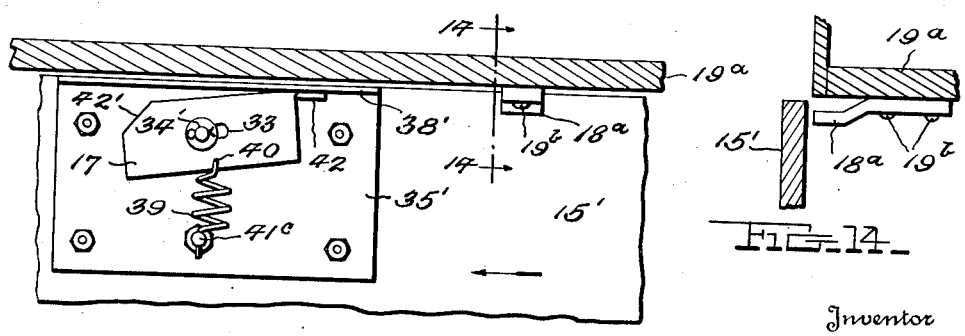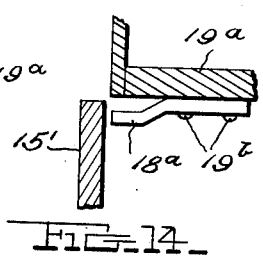

Patented Jan. 20, 1942

2,270,283

UNITED STATES PATENT OFFICE 2,270,283

ONE-WAY STOP MECHANISM

Arno A. Ewald, Oakfield, Wis., assignor to Romort Manufacturing Company, Oakfield, Wis.

Application June 19, 1941, Serial No. 398,835

5 Claims. (Cl. 192—7)

The invention aims to provide an exceptionally simple, inexpensive, efficient and durable stop mechanism for use wherever a movable member (a grease, air or water hose reel, for example) must be movable freely in one direction at times, must then be held for a desired period against return, and must finally be returned, the construction being such that release of the stop mechanism is effected by a slight movement of the movable member (for example, by a short pull on the hose, if the stop be associated with a hose reel).

With the foregoing in view, the invention resides in the novel subject matter hereinafter described and claimed, description being accomplished by reference to the accompanying drawings.

Figure 1 is a perspective view showing the invention associated with a grease hose reel, one side of the reel casing being removed.

Figure 2 is a perspective view of the movable stop member.

Figures 3 to 8 inclusive, are detail side elevations partly in section showing various positions which the movable stop member assumes during operation.

Figure 7:
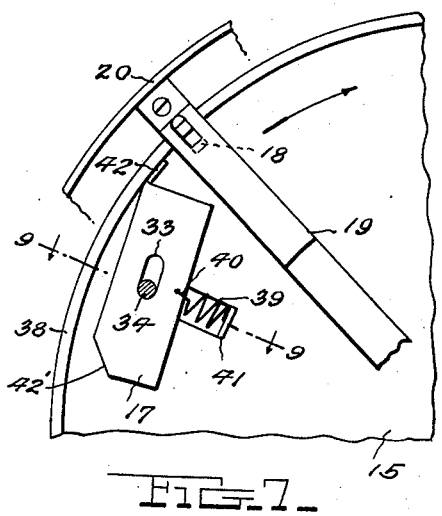
Figure 8:
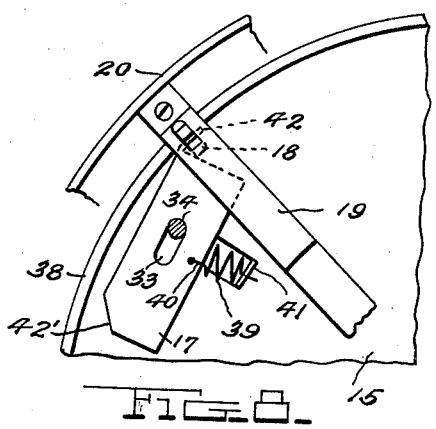

Figure 9 is a detail sectional view on line 9—9 of Fig. 7.

Figure 10 is a fragmentary view similar to a portion of Fig. 9 but showing a modified way of anchoring the spring which is associated with the movable stop.

Figure 11 is a fragmentary side elevation showing the movable stop mounted on a bolted-on plate instead of directly upon the reel as in preceding views.

Figure 12 is a detail section on line 12—12 of Fig. 11.

Figure 13 is a detail fragmentary elevation partly in section showing one manner in which the stop mechanism may be associated with a sliding door or window, or with a similar member.

Figure 14 is a detail vertical section on line 14—14 of Fig. 13.

Preferred features of construction have been illustrated and will be rather specifically described, with the understanding, however, that variations may be made within the scope of the invention as claimed.

In Figs. 1 to 12, inclusive, the stop mechanism is shown associated with the reel 15 of a grease hose or the like 16, but Figs. 13 and 14 illustrate the fact that the mechanism is not restricted to use with a member which is movable about an axis of rotation, but may also be employed in connection with the slidable door, window or the like 15'. In both examples, the movable stop 17 may be constructed in the same manner but the fixed stops 18 with which the movable stop 17 coacts in a hose reel installation, will of course be somewhat different from the stops 18ª provided to coact with said movable stop in a sliding door or window installation. In connection with the hose reel, the stops 18 may well be carried by a spider 19 secured to the reel casing 20, and said stops may be punched out from the metal of the spider, whereas in a door or window installation, the stops 18ª are secured to the lower side of the top frame member 19ª by screws or the like 19ᵇ.

In order that they may not be confused with the gist of the present invention, a number of more or less conventional features of construction illustrated in Fig. 1 will be briefly explained. The spider 19 carries a swivel coupling 21 by means of which a spiral grease conducting metal tube 22 leading from the grease supply line 23, is coupled to a short tube 24 which rotates with the reel 15, said tube 24 being coupled at 25 to the hose 16 where its inner end merges from an opening in one side of said reel. In the present showing, the attaching base 26 of the casing 20 is bolted to overhead supports 27, and the free end of the hose 16 hangs from said casing, passing outwardly through the latter within the confines of a series of guide rollers 28 against which the usual stop ball 29 of the hose may rest when said hose is fully wound on the reel 15. At 30, I have indicated a spring in the hub structure of the reel 15 for turning said reel in a direction to wind the hose, and the improved stop mechanism is brought into play to prevent rewinding of the hose whenever a desired length thereof is unreeled, said mechanism, however, being releasable by a short pull on the hose when the latter is to be rewound.

In the present disclosure, the movable stop 17 is in the form of an elongated sheet metal plate having reinforcing flanges 31 and 32 on its longitudinal edges. The intermediate portion of this plate is formed with an elongated slot 33 receiving a pivot stud 34 which projects outwardly from one of the side plates of the reel 15, or said slot receives a corresponding pivot stud 34' carried by a door or the like 15' (Figs. 13 and 14). The stud 34 may either be secured to the reel 15 as seen in Fig. 9, or it may be secured to a bolted-on plate 35 (Figs. 11 and 12) or the pivot stud may be carried by a plate 35' to be suitably fastened to a door or the like 15'. Possible sliding of the stop 17 from the stud 34 is prevented in the present disclosure by means of a washer 36 and cotter pin 37. The slot and stud mount the movable stop 17 so that it may slide substantially unidirectionally with the line of movement of the movable member on which it is mounted (reel 15 in most views and door or the like 15' in Figs. 13 and 14). Said stud and slot also mount the movable stop 17 so that it may tilt, and suitable provision is made for limiting the tilting movements of said stop 17. In most views, this limiting is effected by coaction of the flange 31 (of stop 17) with the usual lateral bead 38 on the reel 15, but in Fig. 13, a stop flange 38' has been provided for this purpose, said flange being carried rigidly by the plate 35'.

A compression spring 39 is provided to tilt the movable stop 17 in one direction when said stop 17 is slid in one direction, and to tilt said stop 17 in the other direction when it is slid in this direction, the tilting being limited by the bead 38 or the stop flange 38' as above explained, one end of said spring being connected at 40 with substantially the central portion of the stop 17 while the other end of said spring is connected with a suitable thrust-receiving abutment. In most views, this abutment is in the form of a lug 41 stamped from one side of the reel 15. A corresponding lug 41a, however, is stamped from the plate 35 in Fig. 11. Fig. 10 also shows that the abutment may be in the form of a stud 41b if desired, and the abutment 41c on the plate 35' in Fig. 13, is of this latter type. The point at which the upper end 40 of the spring is connected with the movable stop 17 is between the ends of the slot 33 and is preferably somewhat toward the left end of said slot. When the slot 17 is slid in one direction past a dead center line, the spring 39 expands and quickly tilts said stop in one direction. When the stop is slid in the other direction until the spring passes a dead center line, however, said spring immediately acts to tilt said stop in the other direction. When stop 17 is in one of these tilted positions, one of its ends is so positioned that it will strike the next stop 18 or 18a and when said stop 17 occupies its other tilted position, its other end is positioned to strike the last stop 18 or 18a which it has just passed, when the reel, door or the like is permitted to move retrogradely to some extent. One end of the stop 17 is provided with a longitudinally projecting detent 42 which is adapted to engage the stop 18 or 18a (see Fig. 8) and hold said stop 17 against tilting under the influence of spring 39 even though said stop 17 has been slid by striking said stop, to the position at which said spring is in readiness to act. In this position, the stop 17 holds the reel 15 against turning in hose-winding direction or will hold the door or the like 15' against movement in one direction. Just as soon, however, as the reel 15 or the door or the like is moved sufficiently to allow 42 to clear 18 or 18a, the spring 39 will act to tilt the stop 17 to the position shown in Fig. 3. Thus, the reel may rotate in hose-winding direction, or the door or the like 15' may move in the direction in which the stop previously prohibited movement. During this movement, the left end of the stop 17 simply clicks over any stop which it encounters, remaining for the most part in the position shown in Fig. 3 and preferably coming finally to rest in this position.

Figure 4:
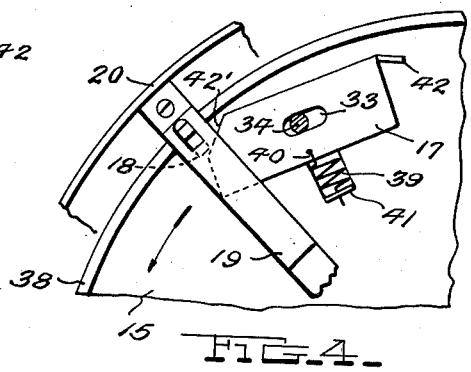
Figure 5:
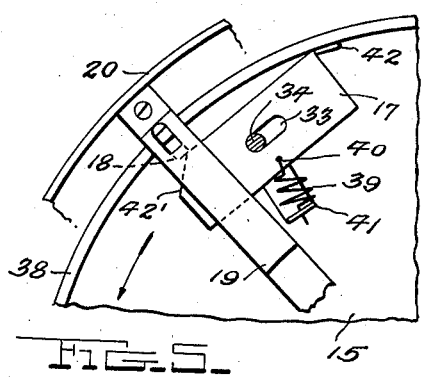
Figure 6:
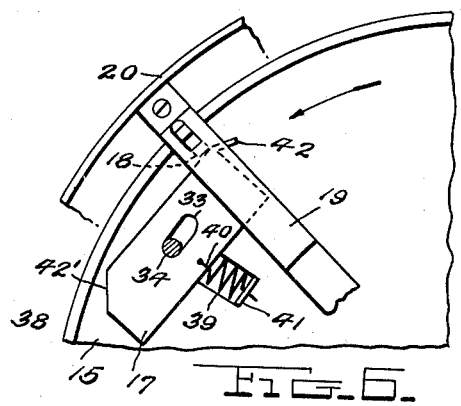

The end of the movable stop 17 opposite the detent 42 is devoid of any corresponding detent so that whenever said stop 17 is slid to the position of Fig. 5, for example, by striking a stop such as 18, there is nothing to prevent the spring 39 from acting to tilt said stop 17. In fact, the end of the stop 17 under consideration is preferably provided with a cam 42' which tends to tilt the stop as it is being slid, as will be clear from Figs. 4 and 5.

Figure 3:
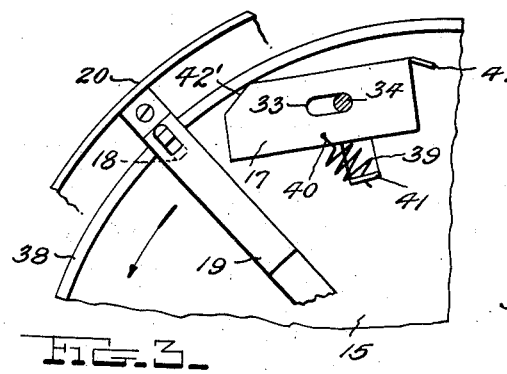

In explaining the operation of the stop mechanisms, only the mechanism associated with a hose reel will be explained, and the rest will be obvious. The movable stop 17 occupies a position such as that shown in Fig. 1 when the hose 16 is fully wound. When this hose is pulled to unwind same, the reel 15 rotates and the stop 17 approaches the first fixed stop 18 as seen in Fig. 3. When the bevel or cam 42' strikes this stop 18 (see Fig. 4), the stop 17 is slid toward the right as seen in Fig. 4 to prepare the spring 39 for action, and at the same time, the lug 18 and cam 42' tilt the movable stop 17 somewhat as also seen in Fig. 4. By the time spring 39 has passed to the right of dead center (Fig. 5), it acts on the plate or stop 17 and tilts it to the position shown in Fig. 5, with the detent 42 lying against the inner edge of the bead 38. As the reel 15 continues to turn in the direction indicated by the arrows in Figs. 3, 4, 5 and 6, the stop 17 passes the fixed stop 18 and any other stops which it may encounter, merely clicking over them as will be seen by comparing Figs. 6 and 7. Whenever the movable stop 17 has reached a position in advance of one of the stops 18 (see Fig. 7, for example) and the reel 15 is allowed to turn retrogradely (see arrow in Fig. 7), the right end of the movable stop 17 will abut the lug or stop 18 it has just passed and consequently said movable stop will be slid to the position shown in Fig. 8. In this position, while the spring 39 is in readiness to tilt the stop 17 back to the position shown in Fig. 3, it cannot do so because of the fact that the detent 42 is engaged with the lug 18. Therefore, the stop mechanism will in this position hold the reel against retrograde movement until desired. When it is necessary, however, that the reel 15 turn retrogradely to wind the hose, it is simply necessary to give a short pull on said hose, thus turning said reel (counter-clockwise in Fig. 8) and freeing the detent 42 from the lug or stop 18. The spring 39 then immediately tilts the movable stop 17 back to the Fig. 3 position and as the reel winds the hose (turning clockwise), the trailing end of the movable stop 17 simply clicks over any stop 18 which it encounters.

While the preceding explanation is necessarily rather lengthy, it will be observed that the movable stop 17 will coact with any of the stops 18 to prevent hose rewinding when the hose has been unwound to any desired extent, and it will also be obvious that in order to release the stop mechanism and permit hose rewinding, it is simply necessary to give a short pull on the hose.

From the foregoing taken in connection with the accompanying drawings, it will be seen that novel and advantageous provision has been made for carrying out the object of the invention, and while preferred details have been illustrated, attention is again invited to the possibility of making variations within the scope of the invention as claimed.

What is claimed is:

1. In a one-way stop mechanism for a member movable in opposite directions with respect to a fixed member; a stop fixed to one of said members; a movable stop and means slidably and tiltably mounting it on the other of said members in such position that the two stops may pass each other, the sliding of said movable stop being substantially unidirectional with the line of movement of said movable member, and the tilting of said movable stop being transverse to said line of movement; and spring means acting on said movable stop for tilting said movable stop in one direction to one oblique position when said movable stop is slid in one direction, and for tilting said movable stop in the other direction to a second oblique position when said movable stop is slid in the other direction; means for so limiting said tilting that one end of said movable stop is positioned to strike said fixed stop when said movable stop occupies said one oblique position, and the other end of said movable stop is positioned to strike said fixed stop when said movable stop occupies said second oblique position, whereby said fixed stop will slide said movable stop in one direction, in readiness for said spring means to act, as said movable member is moved in one direction and will slide said movable stop in the other direction, in readiness for said spring means to act, as said movable member is moved in the other direction; one end of said movable stop being provided with a detent which engages said fixed stop and arrests tilting of said movable stop under the influence of said spring means when said movable stop is slid in said other direction by striking said fixed stop, the other end of said movable stop being devoid of any corresponding detent and thus permitting said movable stop to tilt under the influence of said spring means when said movable stop is slid in said one direction by striking said fixed stop, said detent being releasable from said fixed stop by slight movement of said movable member reversely from the direction of movement which engaged said detent with said fixed stop, whereby said spring means may then tilt said movable stop from engagement with said fixed stop.

2. In a one-way stop mechanism for a member movable in opposite directions with respect to a fixed member; a stop fixed to one of said members; a movable stop and means slidably and tiltably mounting it on the other of said members in such position that the two stops may pass each other, the sliding of said movable stop being substantially unidirectional with the line of movement of said movable member, and the tilting of said movable stop being transverse to said line of movement; and spring means acting on said movable stop for tilting said movable stop in one direction to one oblique position when said movable stop is slid in one direction, and for tilting said movable stop in the other direction to a second oblique position when said movable stop is slid in the other direction; means for so limiting said tilting that one end of said movable stop is positioned to strike said fixed stop when said movable stop occupies said one oblique position, and the other end of said movable stop is positioned to strike said fixed stop when said movable stop occupies said second oblique position, whereby said fixed stop will slide said movable stop in one direction, in readiness for said spring means to act, as said movable member is moved in one direction and will slide said movable stop in the other direction, in readiness for said spring means to act, as said movable member is moved in the other direction; one end of said movable stop being provided with a detent which engages said fixed stop and arrests tilting of said movable stop under the influence of said spring means when said movable stop is slid in said other direction by striking said fixed stop, the other end of said movable stop being provided with a cam cooperable with said fixed stop to start tilting said movable stop while the latter is being slid in said one direction by striking said fixed stop, said detent being releasable from said fixed stop by slight movement of said movable member reversely from the direction of movement which engaged said detent with said fixed stop, whereby said spring means may then tilt said movable stop from engagement with said fixed stop.

3. A structure as specified in claim 1; said movable stop consisting of an elongated plate having a longitudinal slot between its ends; and a pivot stud carried by said other of said members and received slidably in said slot; said slot and stud constituting said means for slidably and tiltably mounting said movable stop.

4. A structure as specified in claim 1; said movable stop consisting of an elongated plate having reinforcing flanges on its longitudinal edges, one end of one of said flanges being extended to form said detent.

5. A structure as specified in claim 1; said spring means consisting of a single spring connected at one end with said other of said members, the other end of said spring being connected with said movable stop at a point which moves to one side or the other of a dead-center line according to the direction in which said movable stop is slid.

ARNO A. EWALD.